United States Patent
Qian et al.

(10) Patent No.: US 11,518,837 B1
(45) Date of Patent: Dec. 6, 2022

(54) MULTI-ARM POLYCARBOXYLATE WATER REDUCER AND PREPARATION METHOD THEREOF

(71) Applicants: Jiangsu ARIT New Materials CO., LTD., Nanjing (CN); Chengdu ARIT Times New Material Co., Ltd., Chengdu (CN)

(72) Inventors: Shanshan Qian, Nanjing (CN); Xu Zhao, Nanjing (CN); Jinying Peng, Nanjing (CN); Tong Lu, Nanjing (CN); Xuechuan Wang, Nanjing (CN); Haojie Qu, Nanjing (CN); Pengcheng Yu, Nanjing (CN); Chunyang Zheng, Nanjing (CN)

(73) Assignees: Jiangsu ARIT New Materials CO., LTD., Nanjing (CN); Chengdu ARIT Times New Material Co., Ltd., Chengdu (CN)

( * ) Notice: Subject to any disclaimer, the term of this patent is extended or adjusted under 35 U.S.C. 154(b) by 0 days.

(21) Appl. No.: 17/845,123

(22) Filed: Jun. 21, 2022

(30) Foreign Application Priority Data

Sep. 15, 2021 (CN) .......................... 202111080969.0

(51) Int. Cl.
  *C08F 283/06* (2006.01)
  *C04B 24/26* (2006.01)
  *C04B 103/30* (2006.01)

(52) U.S. Cl.
  CPC ...... *C08F 283/065* (2013.01); *C04B 24/2694* (2013.01); *C04B 2103/302* (2013.01)

(58) Field of Classification Search
  CPC ................................................ C08F 2103/302
  See application file for complete search history.

(56) References Cited

U.S. PATENT DOCUMENTS

| 5,985,989 A | * | 11/1999 | Shawl | ..................... C08L 71/02 524/755 |
| 2012/0214901 A1 | * | 8/2012 | Bury | ....................... C04B 28/02 524/4 |

FOREIGN PATENT DOCUMENTS

| CN | 103193410 A | 7/2013 |
| CN | 106380550 A | 2/2017 |
| CN | 107698721 A | 2/2018 |
| CN | 108147703 A | 6/2018 |

* cited by examiner

*Primary Examiner* — Christopher M Rodd
(74) *Attorney, Agent, or Firm* — Muncy, Geissler. Olds & Lowe. P.C.

(57) ABSTRACT

The present invention discloses a multi-arm polycarboxylate water reducer and a preparation method thereof, the preparation method includes the following steps: making a phenolic hydroxyl containing rigid compound and p-nitrobenzonitrile subjected to a nucleophilic substitution reaction in a solvent, then subjected to addition with a sodium azide in a solvent and water mixed solution to obtain a tetrazole derivative; making an unsaturated polyether macromonomer subjected to terminal halogenation and react with the prepared tetrazole derivative to obtain a tetrazole-containing multi-arm unsaturated polyether macromonomer; and subjecting the tetrazole-containing multi-arm unsaturated polyether macromonomer, an unsaturated carboxylic acid small monomer and an unsaturated polyether macromonomer to a free radical polymerization reaction under combined action of an initiator, a reducing agent and a molecular weight regulator to obtain the multi-arm polycarboxylate water reducer integrating shrinkage reducing and antibacterial functions.

9 Claims, No Drawings

MULTI-ARM POLYCARBOXYLATE WATER REDUCER AND PREPARATION METHOD THEREOF

TECHNICAL FIELD

The present invention relates to the technical field of polycarboxylate water reducers for cement concrete, in particular to a multi-arm polycarboxylate water reducer and a preparation method thereof.

BACKGROUND

The addition of a water reducer can significantly increase the water reducing rate and improve the concrete workability. With the continuous increase in the market demand for admixtures, the first-generation water reducer represented by lignin and the second-generation water reducer represented by naphthalene have long been unable to meet the construction needs of the site. The third-generation concrete water reducer is a polycarboxylate comb-type water reducer, which improves the concrete workability much higher than the previous two generations of water reducers, and has become the mainstream concrete water reducer on the market today.

With the increase in the amount and scope of use of the polycarboxylate water reducer, more and more problems are exposed. For example, the concrete added with a traditional water reducer generally shrinks in the later stage, resulting in a smaller volume of the concrete and possible cracks, which will eventually affect the strength of the concrete and reduce the durability. The usual solution is to add fibers or expansion agents to the concrete, but this method has low economical applicability and is not suitable for large-scale use. In addition, when the water reducer is compounded, some retarding components such as malt or sugar will be added. If the storage time is too long or the temperature is too high, the compounded water reducer will become mildewed and smelly, and this phenomenon seriously affects the working performance of the water reducer. The usual solution is to continue compounding bactericidal components into the water reducer, but this method is less environmentally friendly.

Many studies have given solutions to the problem of concrete shrinkage. The invention titled Shrinkage-Reducing Poly Carboxylic Acid Water Reducing Agent and Preparation Method with the publication number of CN103193410A published on Jul. 10, 2013 discloses a shrinkage-reducing poly carboxylic acid water reducing agent prepared by copolymerizing sodium methallyl sulfonate, sodium methacrylate, allyl polyethylene glycol and diethylene glycol monobutyl ether maleic anhydride monoester. This water reducing agent has a very good reduction effect on the 3-d and 28-d shrinkage ratios, but the activity of monomers used by the water reducing agent is quite different, which cannot guarantee the stable shrinkage reduction performance of a polymer, and makes the concrete durability worse. The patent titled Surface Tension Adjustment Reduction Type Polycarboxylate Superplasticizer and Preparation Method Thereof with the publication number of CN106380550A published on Feb. 8, 2017 discloses a polycarboxylate superplasticizer that achieves a shrinkage reduction effect by introducing hydrophobic groups to adjust surface tension and a preparation method thereof. The synthesized superplasticizer can significantly reduce the surface tension of water, reduce shrinkage force during water evaporation, and significantly reduce the 28 d shrinkage ratio of concrete. However, this method requires an esterification reaction with harsh reaction conditions, and it is difficult to carry out industrial production.

In recent years, there have also been many reports on the research on antibacterial water reducers. The invention titled Branched Antibacterial Polycarboxylic Acid Water Reducer As Well As Preparation Method and Application Thereof with the publication number of CN107698721A published on Feb. 16, 2018 discloses a branched antibacterial polycarboxylic acid water reducer containing an imidazolium salt structure. The branched antibacterial polycarboxylic acid water reducer has a good antibacterial effect, but the large amount of use of functional monomers and the high cost limit its use. The invention titled Antibacterial Thickened Concrete Water Reducing Agent and Preparation Method with the publication number of CN108147703A published on Jun. 12, 2018 discloses a concrete water reducing agent synthesized by compounding a polycarboxylic acid water reducing mother solution, a preservative, a nitrite, an alkalinity regulator and a thickening mother solution. The water reducing agent has the advantages such as high water reducing rate, stable properties and excellent antibacterial properties, but the nitrite with higher risk is used in raw materials, which is not suitable for large-scale industrial production.

Starting from the structure of the water reducer, by introducing rigid groups, the invention reduces the surface tension of water in concrete, reduces shrinkage force of water evaporation, and achieves the purposes of crack resistance and shrinkage reduction, and then achieves the antibacterial purpose by introducing a tetrazole structure with excellent antibacterial properties.

SUMMARY

1. Technical Problems to be Solved

For the above technical problems, the present invention provides a polycarboxylate water reducer and a preparation method thereof. Starting from a structure of a water reducer itself, the present invention finally obtains a multi-arm polycarboxylate water reducer integrating shrinkage reducing and antibacterial functions by introducing hydrophobic groups, namely a benzene structure and a tetrazole structure, into the structure, which solves the problem that water reducers in the prior art have a high shrinkage rate of concrete and the problem that bacteria and fungi easy breed after their compounding.

2. Technical Solutions
A multi-arm polycarboxylate water reducer, having the following structure:
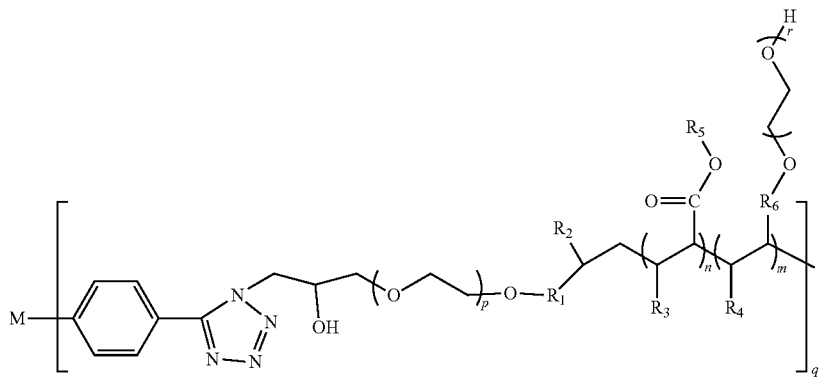
wherein polymerization degrees p, n, m and r are each independently 1 to 100; the number q of branches is 2 to 6;
M is one or a combination of two or more of
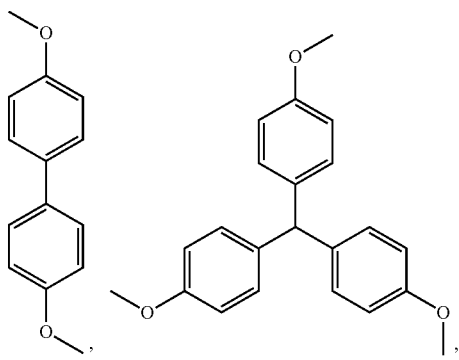,
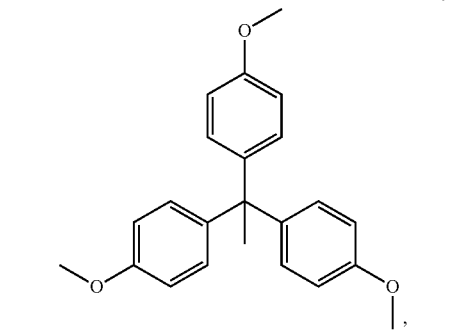,
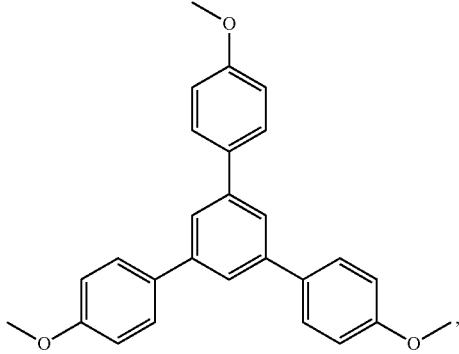,
-continued
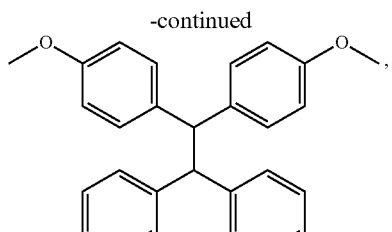,
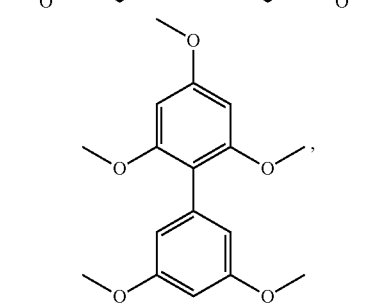,
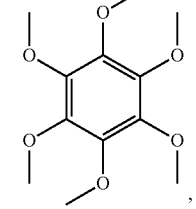,
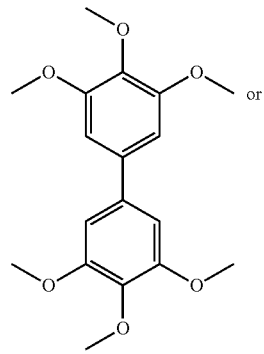 or

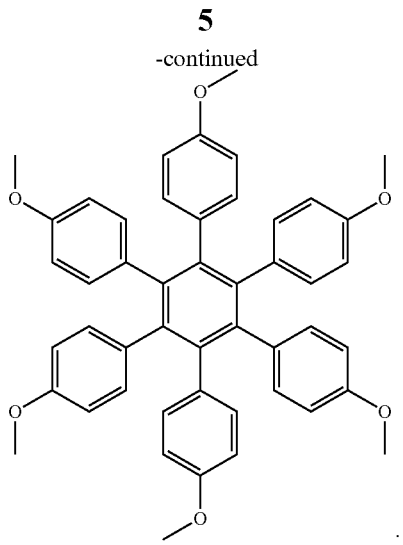

$R_1$ and $R_6$ are both one or a combination of two or more of —$CH_2$—, —$CH_2CH_2$—, —$CH_2CH_2O$— or —$CH_2CH_2CH_2CH_2O$—; $R_2$ and $R_4$ are both one or a combination of two of H or —$CH_3$; $R_3$ is one or a combination of two or more of H, —COOH, —$CH_3$, —$CH_2CH_3$, a phenyl or a phenyl derivative; and $R_5$ is one or a combination of two or more of H, an alkali metal ion, an alkyl containing 1 to 6 carbon atoms, a hydroxyalkyl containing 1 to 6 carbon atoms, an alkoxy containing 1 to 6 carbon atoms, a phenyl or a phenyl derivative.

A preparation method of a multi-arm polycarboxylate water reducer includes the following steps:

Step 1: preparation of a tetrazole derivative: subjecting a phenolic hydroxyl containing rigid compound and p-nitrobenzonitrile to a nucleophilic substitution reaction in a solvent, then subjecting a reaction product and a sodium azide to reflux in a solvent and water mixed solution, and conducting a 1,3-dipolar cycloaddition reaction for 3 hours to 10 hours under action of a catalyst to obtain the tetrazole derivative.

Step 2: preparation of a tetrazole-containing multi-arm unsaturated polyether macromonomer: making an unsaturated polyether macromonomer subjected to terminal halogenation with epoxy halogenated propane under action of boron trifluoride diethyl etherate, then react with the tetrazole derivative prepared in Step 1 for 3 hours to 10 hours to obtain the tetrazole-containing multi-arm unsaturated polyether macromonomer.

Step 3: preparation of a multi-arm polycarboxylate water reducer integrating shrinkage reducing and antibacterial functions: subjecting the tetrazole-containing multi-arm unsaturated polyether macromonomer prepared in Step 2, an unsaturated carboxylic acid small monomer and an unsaturated polyether macromonomer to a free radical polymerization reaction for 3 hours to 5 hours at 10° C. to 50° C. under combined action of an initiator, a reducing agent and a molecular weight regulator to obtain the multi-arm polycarboxylate water reducer integrating the shrinkage reducing and antibacterial functions, wherein a molar ratio of the tetrazole-containing multi-arm unsaturated polyether macromonomer, the unsaturated carboxylic acid small monomer, the unsaturated polyether macromonomer, the initiator, the reducing agent and the molecular weight regulator is 1: (2 to 80): (1 to 20): (0.02 to 0.2): (0.02 to 0.25): (0.02 to 0.2).

Further, in Step 1, the phenolic hydroxyl containing rigid compound is any one or a combination of two or more of 4,4'-dihydroxybiphenyl, 4,4',4''-methylenetriphenol, 1,1,1-tris(4-hydroxyphenyl)ethane, 1,3,5-tris(4-hydroxyphenyl)benzene, 1,1,2,2-tetrakis(4-hydroxyphenyl)ethane, 2,3',4,5',6-pentahydroxybiphenyl, hexahydroxybenzene, 5-(3,4,5-trihydroxyphenyl)benzene-1,2,3-triol or 4-[2,3,4,5,6-penta(4-hydroxyphenyl)phenyl]phenol.

Further, in Step 1, the solvent is any one or a combination of two or more of acetonitrile, methanol, ethanol, ethylene glycol, isopropanol, tert-butanol, acetone, dichloromethane, chloroform, benzene, toluene, dimethyl sulfoxide, N,N-dimethylformamide, and 1,2-dichloroethane.

Further, the catalyst is any one or a combination of two or more of ammonium chloride, zinc chloride, aluminum chloride or ferric chloride.

Further, the unsaturated polyether macromonomer is any one or a combination of two or more of allyl polyoxyethylene ether, methallyl polyoxyethylene ether, isopentenol polyoxyethylene ether, vinyl polyoxyethylene ether or 4-hydroxybutyl vinyl polyoxyethylene ether.

Further, in Step 2, the epoxy halogenated propane is any one or a combination of two or more of epifluorohydrin, epichlorohydrin or epiboromohydrin.

Further, in Step 3, the unsaturated carboxylic acid small monomer is any one or a combination of two or more of acrylic acid, methacrylic acid, maleic acid, sodium acrylate, sodium methacrylate, sodium maleate, potassium acrylate, potassium methacrylate, potassium maleate, 2-vinylbenzoic acid, 2-vinylphenylacetic acid, 2-methyl vinyl benzoate acrylic acid, methyl acrylate, methyl methacrylate, ethyl acrylate, ethyl methacrylate, hydroxyethyl acrylate, hydroxyethyl methacrylate, butyl acrylate, and hydroxy n-butyl methacrylate.

Further, in Step 3, the initiator is any one or a combination of two or more of hydrogen peroxide, ammonium persulfate, sodium persulfate, potassium persulfate, azobisisobutyronitrile or azobisisoheptanenitrile; the reducing agent is any one or a combination of two or more of vitamin C, sodium sulfite, sodium bisulfite, sodium metabisulfite, or sodium hypophosphite; and the molecular weight regulator is any one or a combination of two or more of mercaptoethanol, mercaptoacetic acid, 2-mercaptopropionic acid, 3-mercaptopropionic acid, dodecanethiol, or sodium methyl propenyl sulfonate.

3. Beneficial Effects (1) By giving a rigid hydrophobic group, namely a benzene structure, to a water reducer, the polycarboxylate water reducer prepared by the present invention reduces surface tension of water in concrete, and reduces shrinkage force of water evaporation, thereby solving the problem of late shrinkage of concrete.

(2) By giving a tetrazole structure with excellent antibacterial properties to the water reducer, the polycarboxylate water reducer prepared by the present invention is given antibacterial and antiseptic abilities of the water reducer itself (3) According to the preparation method of the multi-arm polycarboxylate water reducer provided by the present invention, a synthesis method is simple to operate, and industrial production is easy to realize; and raw materials used are widely sourced and easy to obtain.

DETAILED DESCRIPTION OF EMBODIMENTS
A multi-arm polycarboxylate water reducer, having the following structure:
wherein polymerization degrees p, n, m and r are each independently 1 to 100; the number q of branches is 2 to 6.
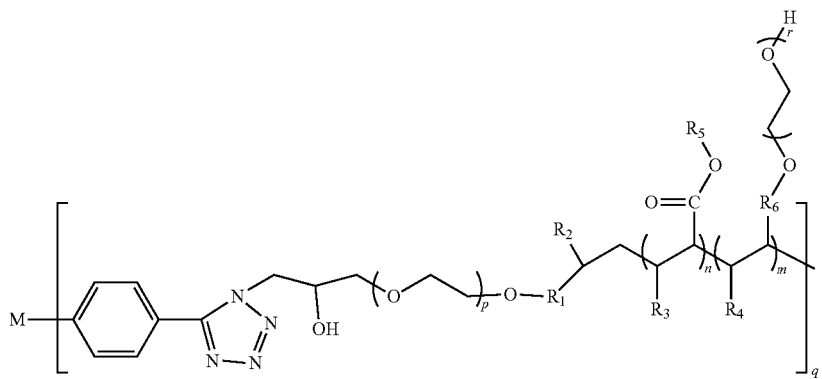
M is one or a combination of two or more of
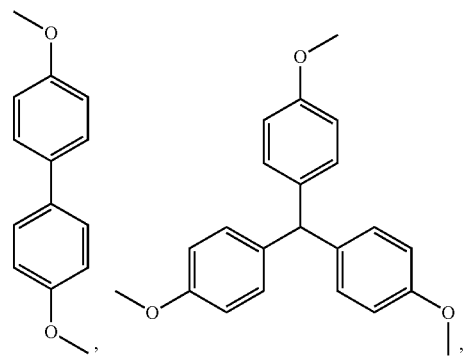,
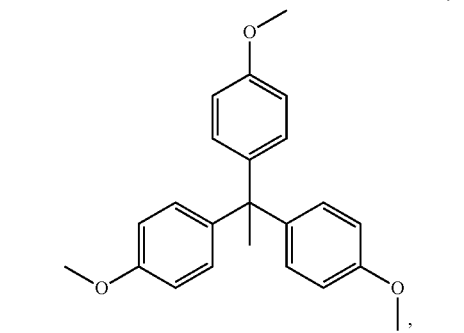,
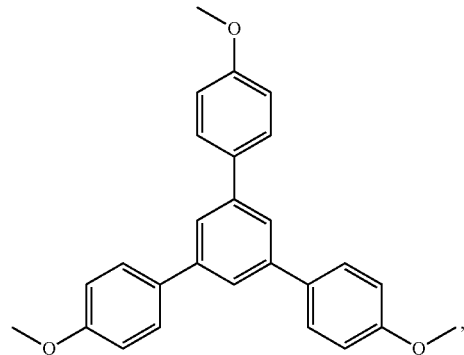,
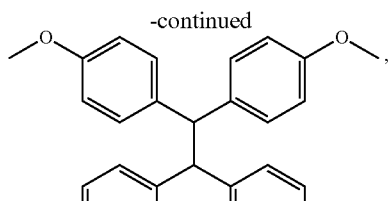
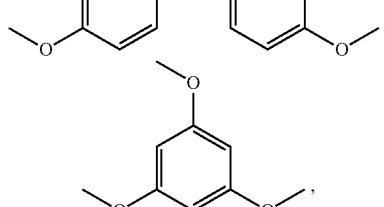,
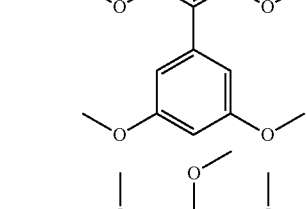,
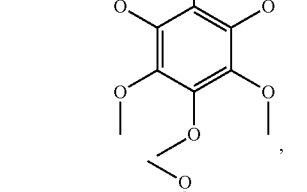,
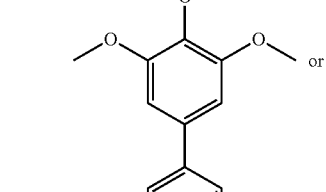 or
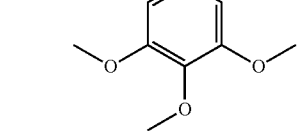

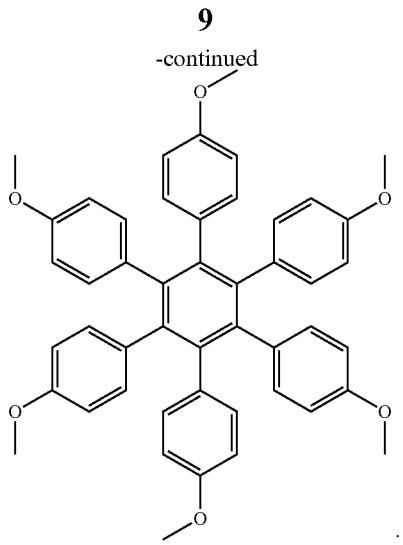

$R_1$ and $R_6$ are both one or a combination of two or more of —$CH_2$—, —$CH_2CH_2$—, —$CH_2CH_2O$— or —$CH_2CH_2CH_2CH_2O$—; $R_2$ and $R_4$ are both one or a combination of two of H or —$CH_3$; $R_3$ is one or a combination of two or more of H, —COOH, —$CH_3$, —$CH_2CH_3$, a phenyl or a phenyl derivative; and $R_5$ is one or a combination of two or more of H, an alkali metal ion, an alkyl containing 1 to 6 carbon atoms, a hydroxyalkyl containing 1 to 6 carbon atoms, an alkoxy containing 1 to 6 carbon atoms, a phenyl or a phenyl derivative.

A preparation method of a multi-arm polycarboxylate water reducer, including the following steps:

Step 1: preparation of a tetrazole derivative: subjecting a phenolic hydroxyl containing rigid compound and p-nitrobenzonitrile to a nucleophilic substitution reaction in a solvent, then subjecting a reaction product and a sodium azide to reflux in a solvent and water mixed solution, and conducting a 1,3-dipolar cycloaddition reaction for 3 hours to 10 hours under action of a catalyst to obtain the tetrazole derivative.

Step 2: preparation of a tetrazole-containing multi-arm unsaturated polyether macromonomer: making an unsaturated polyether macromonomer subjected to terminal halogenation with epoxy halogenated propane under action of boron trifluoride diethyl etherate, then react with the tetrazole derivative prepared in Step 1 for 3 hours to 10 hours to obtain the tetrazole-containing multi-arm unsaturated polyether macromonomer.

Step 3: preparation of a multi-arm polycarboxylate water reducer integrating shrinkage reducing and antibacterial functions: subjecting the tetrazole-containing multi-arm unsaturated polyether macromonomer prepared in Step 2, an unsaturated carboxylic acid small monomer and an unsaturated polyether macromonomer to a free radical polymerization reaction for 3 hours to 5 hours at 10° C. to 50° C. under combined action of an initiator, a reducing agent and a molecular weight regulator to obtain the multi-arm polycarboxylate water reducer integrating the shrinkage reducing and antibacterial functions, wherein a molar ratio of the tetrazole-containing multi-arm unsaturated polyether macromonomer, the unsaturated carboxylic acid small monomer, the unsaturated polyether macromonomer, the initiator, the reducing agent and the molecular weight regulator is 1: (2 to 80): (1 to 20): (0.02 to 0.2): (0.02 to 0.25): (0.02 to 0.2).

Further, in Step 1, the phenolic hydroxyl containing rigid compound is any one or a combination of two or more of 4,4'-dihydroxybiphenyl, 4,4',4"-methylenetriphenol, 1,1,1-tris(4-hydroxyphenyl)ethane, 1,3,5-tris(4-hydroxyphenyl)benzene, 1,1,2,2-tetrakis(4-hydroxyphenyl)ethane, 2,3',4,5',6-pentahydroxybiphenyl, hexahydroxybenzene, 5-(3,4,5-trihydroxyphenyl)benzene-1,2,3-triol or 4-[2,3,4,5,6-penta(4-hydroxyphenyl)phenyl]phenol.

Further, in Step 1, the solvent is any one or a combination of two or more of acetonitrile, methanol, ethanol, ethylene glycol, isopropanol, tert-butanol, acetone, dichloromethane, chloroform, benzene, toluene, dimethyl sulfoxide, N,N-dimethylformamide, and 1,2-dichloroethane.

Further, the catalyst is any one or a combination of two or more of ammonium chloride, zinc chloride, aluminum chloride or ferric chloride.

Further, the unsaturated polyether macromonomer is any one or a combination of two or more of allyl polyoxyethylene ether, methallyl polyoxyethylene ether, isopentenol polyoxyethylene ether, vinyl polyoxyethylene ether or 4-hydroxybutyl vinyl polyoxyethylene ether.

Further, in Step 2, the epoxy halogenated propane is any one or a combination of two or more of epifluorohydrin, epichlorohydrin or epiboromohydrin.

Further, in Step 3, the unsaturated carboxylic acid small monomer is any one or a combination of two or more of acrylic acid, methacrylic acid, maleic acid, sodium acrylate, sodium methacrylate, sodium maleate, potassium acrylate, potassium methacrylate, potassium maleate, 2-vinylbenzoic acid, 2-vinylphenylacetic acid, 2-methyl vinyl benzoate acid, methyl acrylate, methyl methacrylate, ethyl acrylate, ethyl methacrylate, hydroxyethyl acrylate, hydroxyethyl methacrylate, butyl acrylate, and hydroxy n-butyl methacrylate.

Further, in Step 3, the initiator is any one or a combination of two or more of hydrogen peroxide, ammonium persulfate, sodium persulfate, potassium persulfate, azobisisobutyronitrile or azobisisoheptanenitrile; the reducing agent is any one or a combination of two or more of vitamin C, sodium sulfite, sodium bisulfite, sodium metabisulfite, or sodium hypophosphite; and the molecular weight regulator is any one or a combination of two or more of mercaptoethanol, mercaptoacetic acid, 2-mercaptopropionic acid, 3-mercaptopropionic acid, dodecanethiol, or sodium methyl propenyl sulfonate.

SPECIFIC EXAMPLES

Example 1

1) 4,4',4"-Methylenetriphenol (1.2 mol) and p-nitrobenzonitrile (3.5 mol) were subjected to a nucleophilic substitution reaction in DMF (30 mL). Then a reaction product and a sodium azide (3.5 mol) were subjected to reflux in a DMF and water mixed solution. A 1,3-dipolar cycloaddition reaction was conducted for 5 hours under action of catalysis of ammonium chloride (0.2 mol) to obtain a tetrazole derivative.

2) Allyl polyoxyethylene ether (3.5 mol, $M_w$=1,500 g/mol) was subjected to terminal halogenation with epichlorohydrin (3.8 mol) under action of boron trifluoride diethyl etherate (0.2 mol), and then reacted with the tetrazole derivative (1.1 mol) for 4 hours to obtain a tetrazole-containing multi-arm unsaturated polyether macromonomer.

3) The tetrazole-containing multi-arm unsaturated polyether macromonomer (1 mol), acrylic acid (50 mol) and allyl polyoxyethylene ether (9 mol, $M_w$=1,500 g/mol) were subjected to a free radical polymerization reaction for 3.5 hours at 30° C. under combined action of hydrogen peroxide (0.1 mol), vitamin C (0.08 mol) and mercaptoethanol (0.08 mol) to obtain a multi-arm polycarboxylate water reducer ($M_w$=25,000 g/mol) integrating shrinkage reducing and antibacterial functions.

A molecular structural formula is as follows:

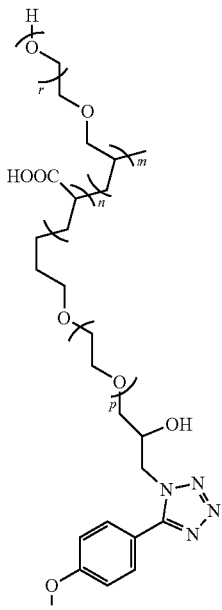

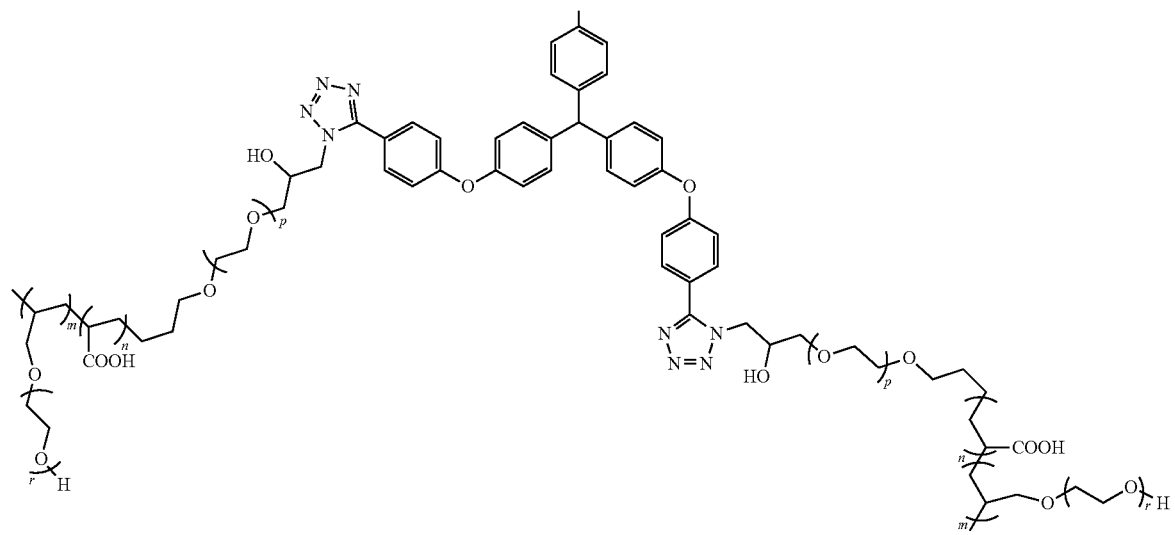

wherein polymerization degrees p, n, m and r are 33, 17, 3 and 33, respectively.

Example 2

1) 1,3,5-Tris(4-hydroxyphenyl)benzene (1.2 mol) and p-nitrobenzonitrile (3.5 mol) were subjected to a nucleophilic substitution reaction in DCM (30 mL). Then a reaction product and a sodium azide (3.5 mol) were subjected to reflux in a DCM and water mixed solution. A 1,3-dipolar cycloaddition reaction was conducted for 8 hours under action of catalysis of ammonium chloride (0.2 mol) to obtain a tetrazole derivative.

2) Isopentenol polyoxyethylene ether (3.5 mol, $M_w$=2,200 g/mol) was subjected to terminal halogenation with epiboromohydrin (3.8 mol) under action of boron trifluoride diethyl etherate (0.2 mol), and then reacted with the tetrazole derivative (1.1 mol) for 5 hours to obtain a tetrazole-containing multi-arm unsaturated polyether macromonomer.

3) The tetrazole-containing multi-arm unsaturated polyether macromonomer (1 mol), methacrylic acid (45 mol) and isopentenol polyoxyethylene ether (12 mol, $M_w$=2,200 g/mol) were subjected to a free radical polymerization reaction for 5 hours at 35° C. under combined action of ammonium persulfate (0.1 mol), sodium bisulfite (0.15 mol) and dodecanethiol (0.06 mol) to obtain a multi-arm polycarboxylate water reducer ($M_w$=35,000 g/mol) integrating shrinkage reducing and antibacterial functions.

A molecular structural formula is as follows:

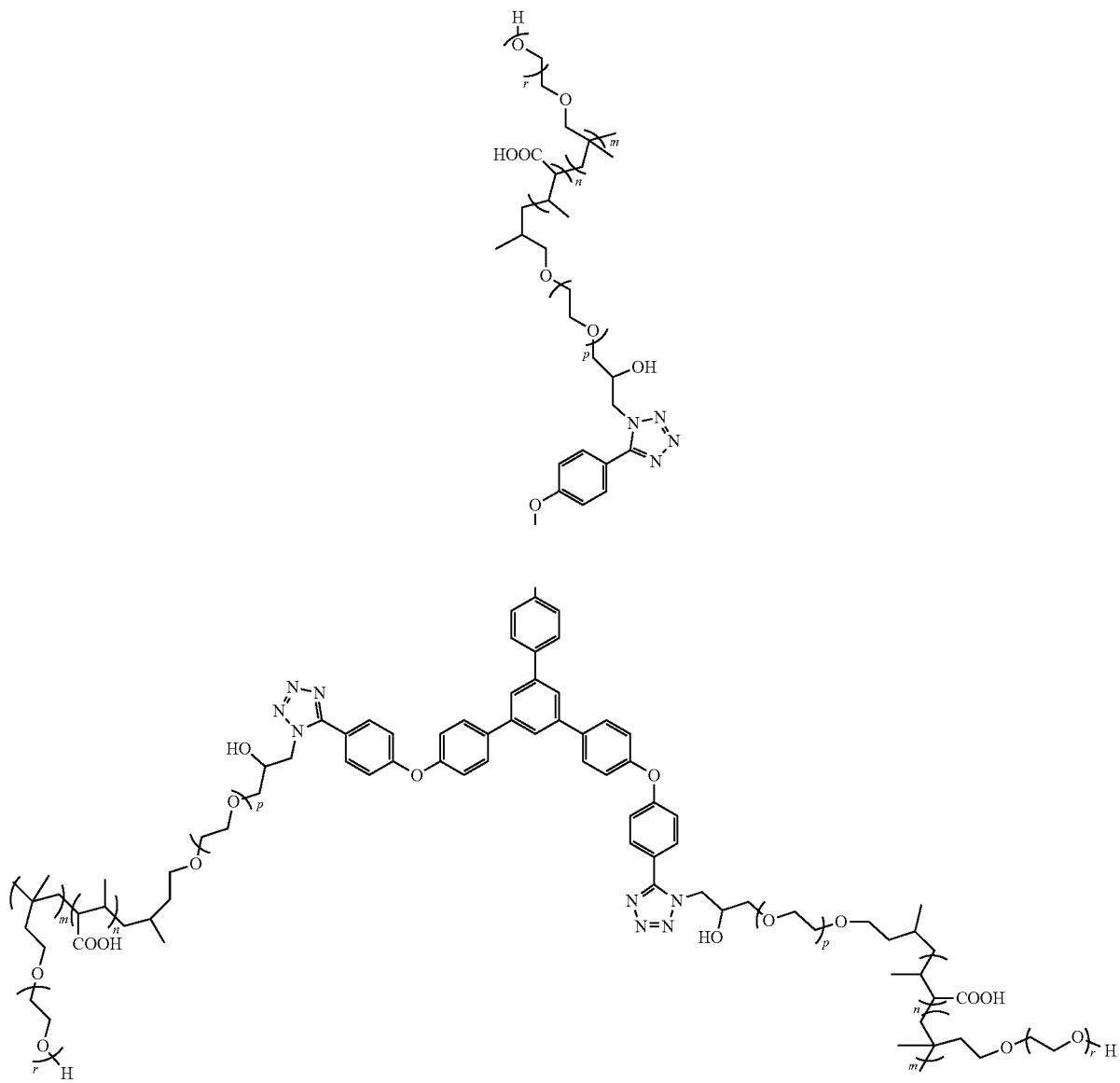

wherein polymerization degrees p, n, m and r are 48, 12, 4 and 48, respectively.

Example 3

1) 1,1,2,2-tetrakis(4-hydroxyphenyl)ethane(1.2 mol) and p-nitrobenzonitrile (4.5 mol) were subjected to a nucleophilic substitution reaction in DMSO (30 mL). Then a reaction product and a sodium azide (4.5 mol) were subjected to reflux in a DMSO and water mixed solution. A 1,3-dipolar cycloaddition reaction was conducted for 6 hours under action of catalysis of zinc chloride (0.2 mol) to obtain a tetrazole derivative.
2) Isopentenol polyoxyethylene ether (4.5 mol, $M_w$=2,900 g/mol) was subjected to terminal halogenation with epichlorohydrin (4.8 mol) under action of boron trifluoride diethyl etherate (0.2 mol), and then reacted with the tetrazole derivative (1.1 mol) for 6 hours to obtain a tetrazole-containing multi-arm unsaturated polyether macromonomer.
3) The tetrazole-containing multi-arm unsaturated polyether macromonomer (1 mol), sodium acrylate (40 mol) and isopentenol polyoxyethylene ether (8 mol, $M_w$=2,900 g/mol) were subjected to a free radical polymerization reaction for 3.5 hours at 40° C. under combined action of potassium persulfate (0.09 mol), sodium metabisulfite (0.15 mol) and 3-mercaptopropionic acid (0.08 mol) to obtain a multi-arm polycarboxylate water reducer ($M_w$=40,000 g/mol) integrating shrinkage reducing and antibacterial functions.

A molecular structural formula is as follows:

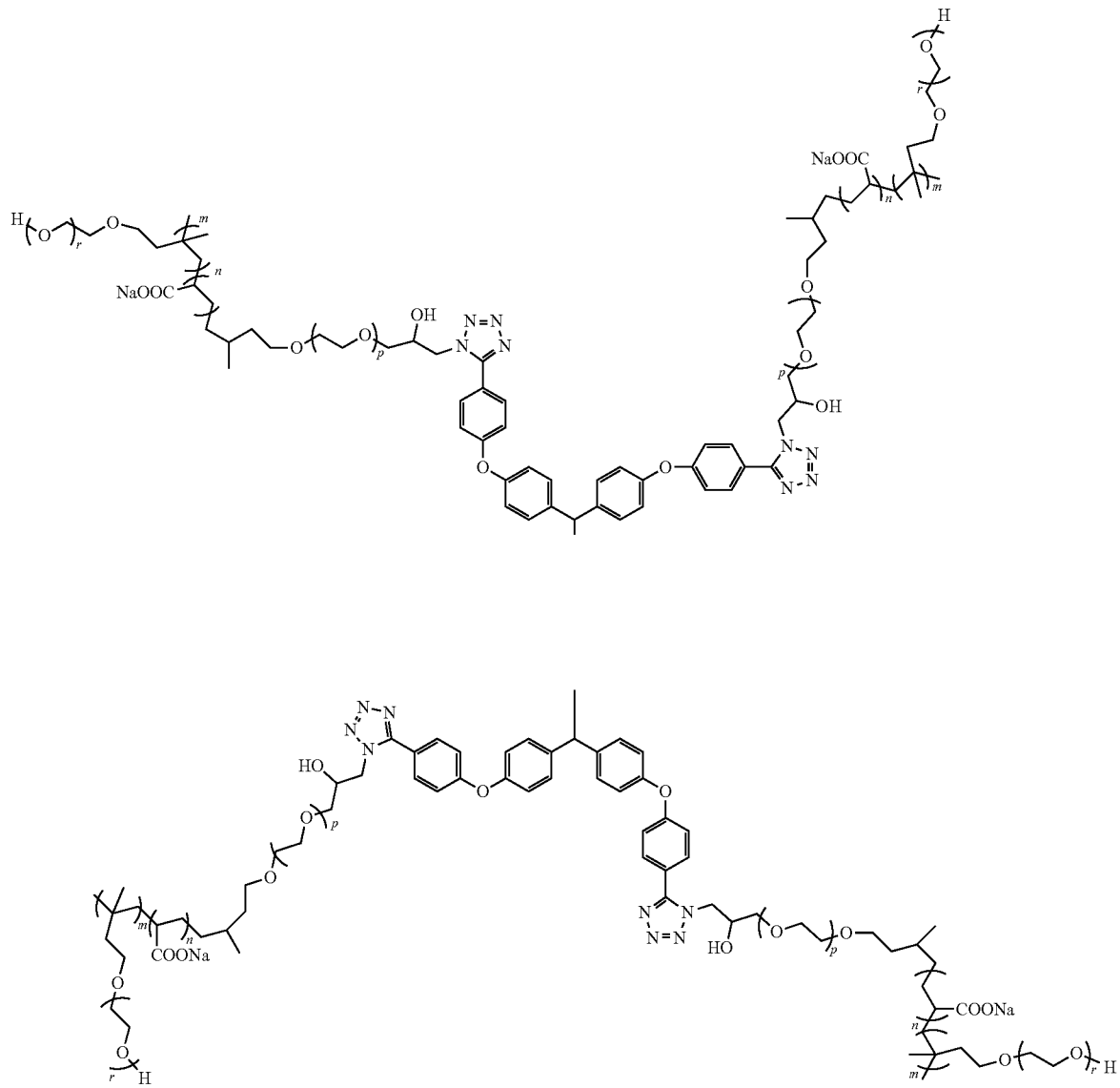

wherein polymerization degrees p, n, m and r are 64, 4, 2 and 64, respectively.

Example 4

1) Hexahydroxybenzene (1.2 mol) and p-nitrobenzonitrile (6.5 mol) were subjected to a nucleophilic substitution reaction in DMF (30 mL). Then a reaction product and a sodium azide (6.5 mol) were subjected to reflux in a DMF and water mixed solution. A 1,3-dipolar cycloaddition reaction was conducted for 7 hours under action of catalysis of ferric chloride (0.2 mol) to obtain a tetrazole derivative.
2) Isopentenol polyoxyethylene ether (6.5 mol, $M_w$=1,500 g/mol) was subjected to terminal halogenation with epichlorohydrin (6.8 mol) under action of boron trifluoride diethyl etherate (0.2 mol), and then reacted with the tetrazole derivative (1.1 mol) for 5 hours to obtain a tetrazole-containing multi-arm unsaturated polyether macromonomer.
3) The tetrazole-containing multi-arm unsaturated polyether macromonomer (1 mol), potassium acrylate (60 mol) and isopentenol polyoxyethylene ether (12 mol, $M_w$=500 g/mol) were subjected to a free radical polymerization reaction for 3.5 hours at 25° C. under combined action of hydrogen peroxide (0.11 mol), sodium bisulfite (0.15 mol) and 3-mercaptopropionic acid (0.06 mol) to obtain a multi-arm polycarboxylate water reducer ($M_w$=60,000 g/mol) integrating shrinkage reducing and antibacterial functions.

A molecular structural formula is as follows:

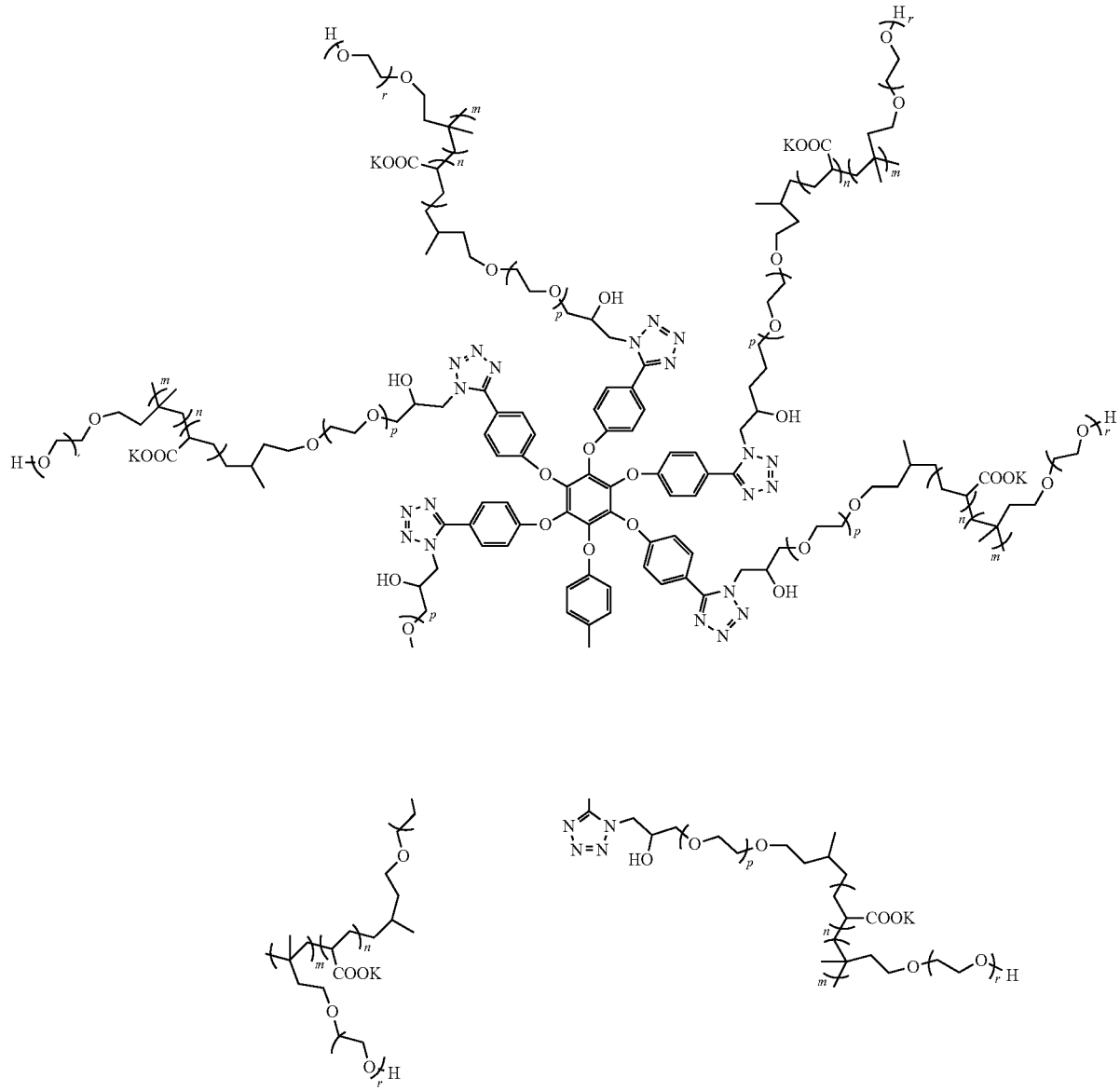

wherein polymerization degrees p, n, m and r are 33, 10, 2 and 33, respectively.

Example 5

1) 1,1,1-Tris(4-hydroxyphenyl)ethane (1.2 mol) and p-nitrobenzonitrile (3.5 mol) were subjected to a nucleophilic substitution reaction in acetone (30 mL). Then a reaction product and a sodium azide (3.5 mol) were subjected to reflux in an acetone and water mixed solution. A 1,3-dipolar cycloaddition reaction was conducted for 6.5 hours under action of catalysis of zinc chloride (0.2 mol) to obtain a tetrazole derivative.
2) Methallyl polyoxyethylene ether (3.5 mol, $M_w$=2,900 g/mol) was subjected to terminal halogenation with epifluorohydrin (3.8 mol) under action of boron trifluoride diethyl etherate (0.2 mol), and then reacted with the tetrazole derivative (1.1 mol) for 7 hours to obtain a tetrazole-containing multi-arm unsaturated polyether macromonomer.
3) The tetrazole-containing multi-arm unsaturated polyether macromonomer (1 mol), methacrylic acid (40 mol) and methallyl polyoxyethylene ether (12 mol, $M_w$=2,900 g/mol) were subjected to a free radical polymerization reaction for 5 hours at 30° C. under combined action of ammonium persulfate (0.08 mol), vitamin C (0.07 mol) and 2-mercaptopropionic acid (0.05 mol) to obtain a multi-arm polycarboxylate water reducer ($M_w$=48,000 g/mol) integrating shrinkage reducing and antibacterial functions.

A molecular structural formula is as follows:

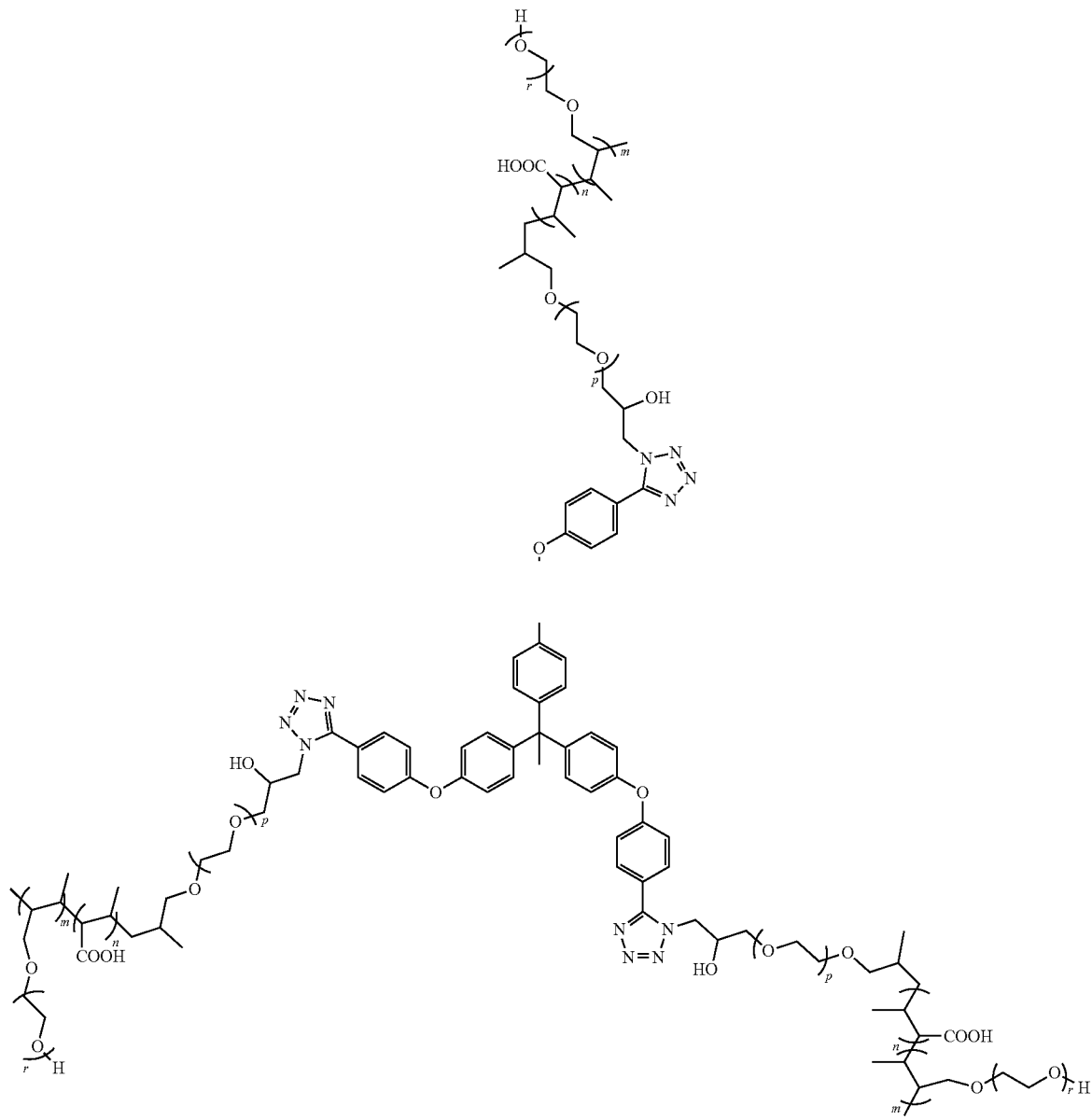

wherein polymerization degrees p, n, m and r are 65, 13, 4 and 65, respectively.

Example 6

1) 4,4',4''-Methylenetriphenol (1.2 mol) and p-nitrobenzonitrile (3.5 mol) were subjected to a nucleophilic substitution reaction in DCM (30 mL). Then a reaction product and a sodium azide (3.5 mol) were subjected to reflux in a DCM and water mixed solution. A 1,3-dipolar cycloaddition reaction was conducted for 8 hours under action of catalysis of ammonium chloride (0.2 mol) to obtain a tetrazole derivative.
2) Vinyl polyoxyethylene ether (3.5 mol, $M_w$=1,500 g/mol) was subjected to terminal halogenation with epichlorohydrin (3.8 mol) under action of boron trifluoride diethyl etherate (0.2 mol), and then reacted with the tetrazole derivative (1.1 mol) for 6 hours to obtain a tetrazole-containing multi-arm unsaturated polyether macromonomer.
3) The tetrazole-containing multi-arm unsaturated polyether macromonomer (1 mol), methacrylic acid (30 mol) and vinyl polyoxyethylene ether (12 mol, $M_w$=1, 500 g/mol) were subjected to a free radical polymerization reaction for 4 hours at 25° C. under combined action of sodium persulfate (0.12 mol), sodium bisulfite (0.14 mol) and mercaptoethanol (0.07 mol) to obtain a multi-arm polycarboxylate water reducer ($M_w$=26,000 g/mol) integrating shrinkage reducing and antibacterial functions.

A molecular structural formula is as follows:

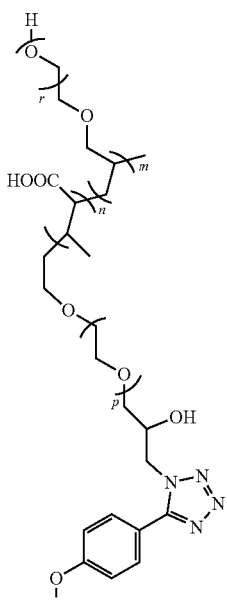

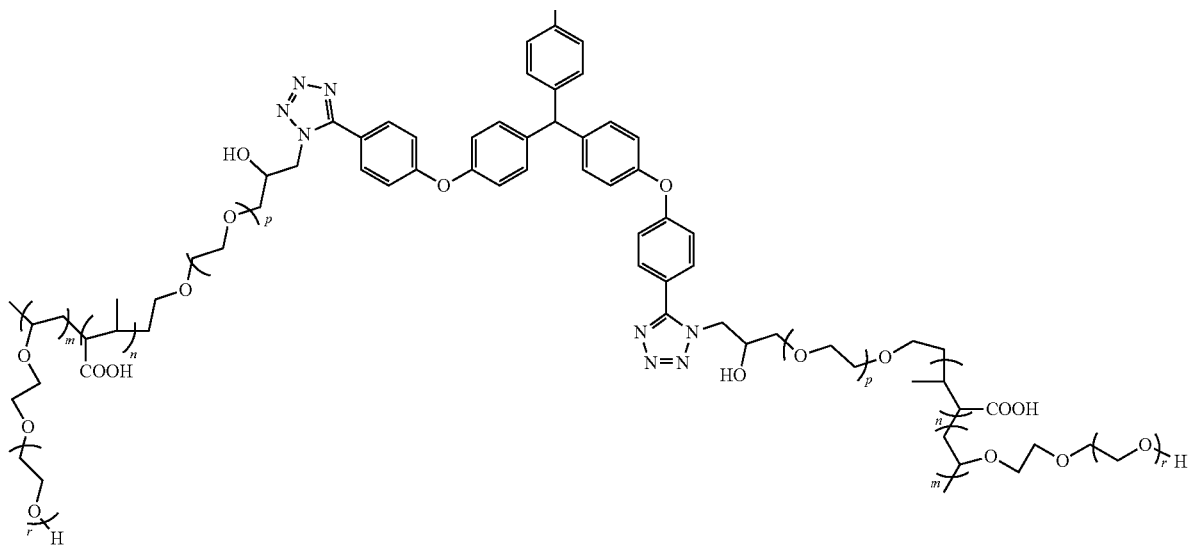

wherein polymerization degrees p, n, m and r are 32, 10, 3 and 32, respectively.

Example 7

1) 1,1,2,2-Tetrakis(4-hydroxyphenyl)ethane (1.2 mol) and p-nitrobenzonitrile (3.5 mol) were subjected to a nucleophilic substitution reaction in DMSO (30 mL). Then a reaction product and a sodium azide (4.5 mol) were subjected to reflux in a DMSO and water mixed solution. A 1,3-dipolar cycloaddition reaction was conducted for 7 hours under action of catalysis of zinc chloride (0.2 mol) to obtain a tetrazole derivative.
2) Isopentenol polyoxyethylene ether (4.5 mol, $M_w$=2,000 g/mol) was subjected to terminal halogenation with epiboromohydrin (4.8 mol) under action of boron trifluoride diethyl etherate (0.2 mol), and then reacted with the tetrazole derivative (1.1 mol) for 4 hours to obtain a tetrazole-containing multi-arm unsaturated polyether macromonomer.
3) The tetrazole-containing multi-arm unsaturated polyether macromonomer (1 mol), potassium methacrylate (60 mol) and isopentenol polyoxyethylene ether (8 mol, $M_w$=2,000 g/mol) were subjected to a free radical polymerization reaction for 4 hours at 25° C. under combined action of hydrogen peroxide (0.1 mol), sodium hypophosphite (0.13 mol) and dodecanethiol (0.09 mol) to obtain a multi-arm polycarboxylate water reducer ($M_w$=32,000 g/mol) integrating shrinkage reducing and antibacterial functions.

A molecular structural formula is as follows:

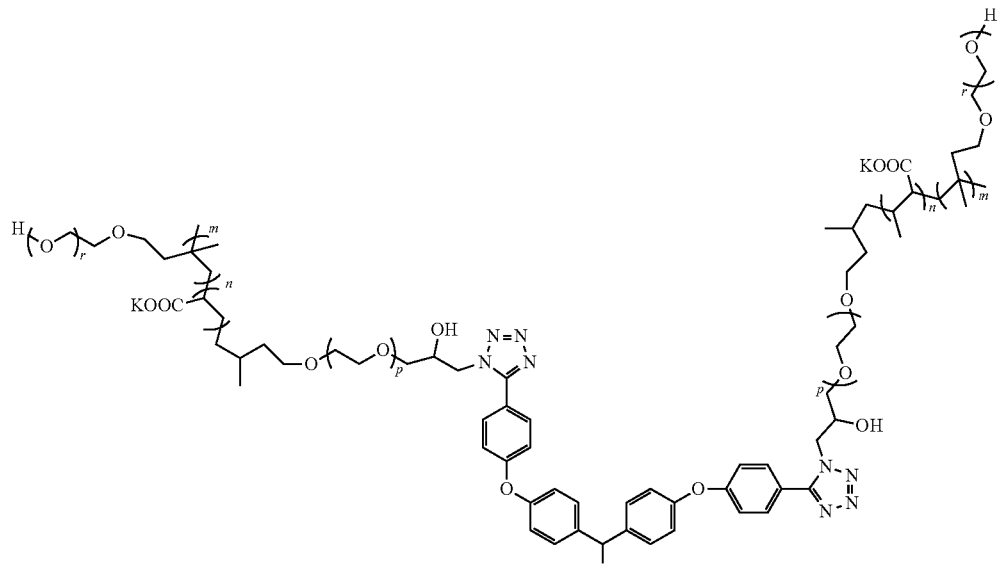

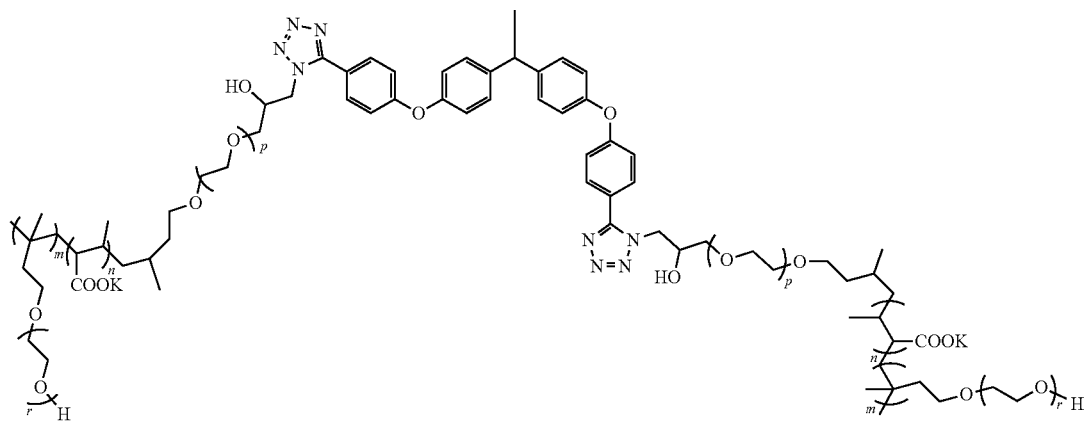

wherein polymerization degrees p, n, m and r are 44, 15, 2 and 44, respectively.

Example 8

1) 1,3,5-Tris(4-hydroxyphenyl)benzene (1.2 mol) and p-nitrobenzonitrile (3.5 mol) were subjected to a nucleophilic substitution reaction in acetone (30 mL). Then a reaction product and a sodium azide (3.5 mol) were subjected to reflux in an acetone and water mixed solution. A 1,3-dipolar cycloaddition reaction was conducted for 7 hours under action of catalysis of ammonium chloride (0.2 mol) to obtain a tetrazole derivative.
2) Isopentenol polyoxyethylene ether (3.5 mol, $M_w$=3,000 g/mol) was subjected to terminal halogenation with epichlorohydrin (3.8 mol) under action of boron trifluoride diethyl etherate (0.2 mol), and then reacted with the tetrazole derivative (1.1 mol) for 6 hours to obtain a tetrazole-containing multi-arm unsaturated polyether macromonomer.
3) The tetrazole-containing multi-arm unsaturated polyether macromonomer (1 mol), sodium acrylate (45 mol) and isopentenol polyoxyethylene ether (9 mol, $M_w$=3,000 g/mol) were subjected to a free radical polymerization reaction for 4.5 hours at 35° C. under combined action of ammonium persulfate (0.1 mol), vitamin C (0.07 mol) and 3-mercaptopropionic acid (0.06 mol) to obtain a multi-arm polycarboxylate water reducer ($M_w$=40,000 g/mol) integrating shrinkage reducing and antibacterial functions.

A molecular structural formula is as follows:

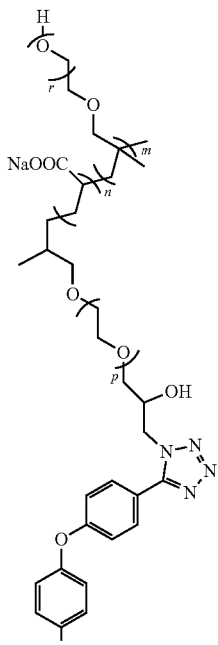

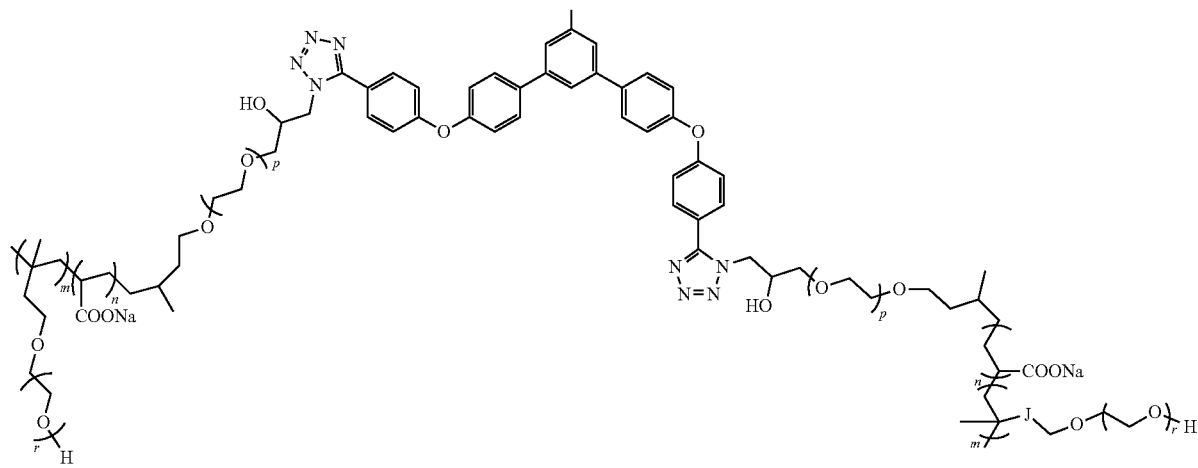

wherein polymerization degrees p, n, m and r are 67, 15, 3 and 67, respectively.

Comparative Example 1

Acrylic acid (5 mol) and allyl polyethylene glycol (1 mol, $M_w$=1,500 g/mol) were subjected to an aqueous solution free radical polymerization reaction for 5 hours at 35° C. under combined action of hydrogen peroxide (0.12 mol), L-ascorbic acid (0.05 mol) and 3-mercaptopropionic acid (0.04 mol) to obtain an antibacterial polycarboxylate water reducer ($M_w$=38,000 g/mol).

A molecular structural formula is as follows:

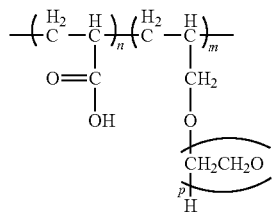

wherein polymerization degrees n, m and p are 100, 20, and 33, respectively.

Comparative Example 2

Potassium acrylate (5 mol) and methallyl polyoxyethylene ether (1 mol, $M_w$=2,200 g/mol) were subjected to an aqueous solution free radical polymerization reaction for 5 hours at 30° C. under combined action of ammonium persulfate (0.08 mol), sodium bisulfite (0.1 mol) and 2-mercaptopropionic acid (0.1 mol) to obtain an antibacterial polycarboxylate water reducer ($M_w$=35,000 g/mol).

A molecular structural formula is as follows:

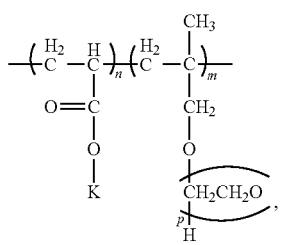

wherein polymerization degrees n, m and p are 64, 13, and 49, respectively.

Test Example

1. Test of neat cement paste fluidity

Referring to GB/T 8077-2012 "Methods for Testing Uniformity of Concrete Admixture", samples obtained in Examples 1 to 8, Comparative Example 1 and Comparative Example 2 were subjected to a neat paste fluidity test. Results were shown in Table 1. Among them, W/C was 0.29, and a solid content of an admixture was 0.15% of the amount of use of cement. Initial neat paste fluidity (after stirring was completed), 1-hour neat paste fluidity and 2-hour neat paste fluidity were tested respectively. The results showed that compared with traditional polycarboxylate water reducers, in all examples, the tested gradual fluidity of neat paste was significantly improved. In addition, it could be found that there was no loss of fluidity basically within 4 hours to 5 hours after stirring was completed.

TABLE 1

Neat paste fluidity and gradual loss of different samples

| | | Neat paste fluidity (mm) | | |
|---|---|---|---|---|
| Sample | Content | Initial | 30 min | 60 min |
| Example 1 | 0.12% | 238 | 234 | 229 |
| Example 2 | | 242 | 235 | 226 |
| Example 3 | | 237 | 232 | 227 |
| Example 4 | | 240 | 235 | 221 |
| Example 5 | | 238 | 232 | 225 |
| Example 6 | | 239 | 232 | 228 |
| Example 7 | | 242 | 237 | 232 |
| Example 8 | | 239 | 235 | 228 |
| Comparative Example 1 | | 230 | 227 | 220 |
| Comparative Example 2 | | 228 | 226 | 217 |

2. Performance test of concrete

Referring to GB 8076-2008 "Concrete Admixtures", samples obtained in Examples 1 to 8, Comparative Example 1 and Comparative Example 2 were subjected to determination of initial slump/extension of concrete, 1-hour gradual loss of slump/extension and strength of concrete specimens. A solid content of an admixture was 0.2% of the amount of use of glue. Specific results were shown in Table 2. The results showed that the examples had higher concrete slump and extension than the comparative examples, and showed more excellent dispersion and dispersion retention performance. In addition, it could be also found that compared with the comparative examples, in the examples, 3-d compressive strength of concrete could be increased maximum by 2.9 MPa, 7-d compressive strength could be increased maximum by 2.8 MPa, and 28-d compressive strength could be increased maximum by 3 MPa. In addition, compared with the concrete mixed with the comparative examples, the concrete mixed with the examples of the present invention had an obvious reduction in a 28-d shrinkage ratio, which could be reduced maximum by 48%.

TABLE 2

Concrete slump retention and mechanical properties of different samples

| | | Slump/Extension (mm) | | Compressive strength/MPa | | | 28-d shrinkage |
|---|---|---|---|---|---|---|---|
| Sample | Content | Initial | 1 h | 3 d | 7 d | 28 d | ratio/% |
| Example 1 | 0.2% | 220/510 | 190/480 | 24.3 | 33.4 | 37.7 | 39 |
| Example 2 | | 215/500 | 185/470 | 25.4 | 34.2 | 36.5 | 41 |
| Example 3 | | 210/520 | 190/480 | 25.2 | 34.5 | 37.9 | 37 |
| Example 4 | | 215/510 | 190/490 | 22.4 | 33.9 | 37.6 | 41 |
| Example 5 | | 220/510 | 195/490 | 24.3 | 32.7 | 38.1 | 41 |
| Example 6 | | 215/520 | 200/480 | 23.9 | 32.8 | 37.6 | 62 |
| Example 7 | | 215/510 | 195/490 | 25.4 | 33.9 | 38.5 | 36 |
| Example 8 | | 200/490 | 185/480 | 23.4 | 34.0 | 38.8 | 38 |
| Comparative Example 1 | | 200/490 | 180/460 | 22.3 | 32.3 | 35.5 | 84 |
| Comparative Example 2 | | 205/480 | 185/460 | 22.6 | 32.7 | 35.8 | 83 |

3. Antibacterial performance test

Referring to JC/T 2552-2019 "Bactericide for Concrete Admixtures", samples obtained in Examples 1 to 8, Comparative Example 1 and Comparative Example 2 were subjected to determination of anti-mold and bactericidal properties. In the test, distilled water was added to an admixture until its solid content is diluted to 15%, then the same amount of microorganisms was injected into each group and stirred evenly, placed in a 30±2° C. incubator for cultivation. Whether there were phenomena of mildew, mycelium or odor was observed. Results were shown in Table 3.

The results showed that for all common polycarboxylate water reducers in the comparative examples, mycelium and odor appeared within 6 months; for Example 6 and Example 8, mycelium and odor appeared after 9 months; and for other examples, mycelium and odor did not appear within 12 months. This also meant that the multi-arm polycarboxylate water reducer integrating shrinkage reducing and antibacterial functions could itself have a good inhibitory effect on bacteria, microorganisms and the like.

TABLE 3

Antibacterial properties of different samples

| Sample | Antibacterial properties (whether there are phenomena of mildew, mycelium or odor) | | | |
|---|---|---|---|---|
| | 3 months | 6 months | 9 months | 12 months |
| Example 1 | × | × | × | × |
| Example 2 | × | × | × | × |
| Example 3 | × | × | × | × |
| Example 4 | × | × | × | × |
| Example 5 | × | × | × | × |
| Example 6 | × | × | × | ✓ |
| Example 7 | × | × | × | × |
| Example 8 | × | × | × | ✓ |
| Comparative Example 1 | ✓ | ✓ | ✓ | ✓ |
| Comparative Example 2 | × | ✓ | ✓ | ✓ |

Although the present invention has been disclosed above with preferred examples, they are not intended to limit the present invention. Anyone skilled in the art can make various changes or modifications without departing from the spirit and scope of the present invention. Therefore, the protection scope of the present invention shall be defined by the protection scope of the claims of the present application.

The invention claimed is:

1. A multi-arm polycarboxylate water reducer, having the following structure:

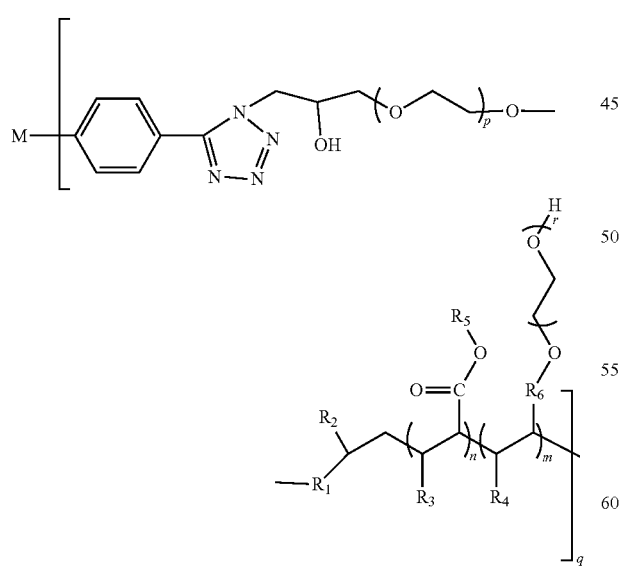

wherein polymerization degrees p, n, m and r are each independently 1 to 100; the number q of branches is 2 to 6;

M is one or a combination of two or more of

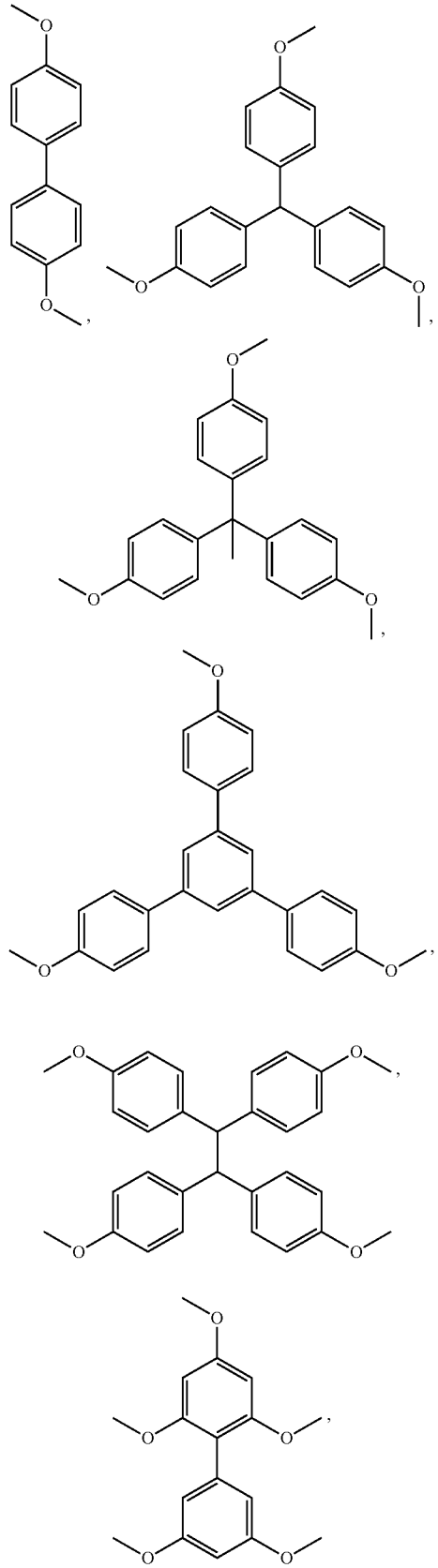

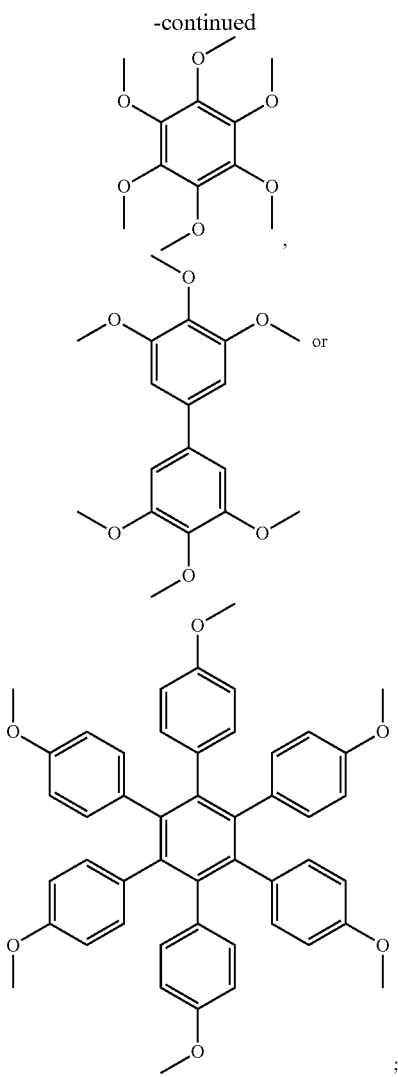

$R_1$ and $R_6$ are both one or a combination of two or more of —$CH_2$—, —$CH_2CH_2$—, —$CH_2CH_2O$— or —$CH_2CH_2CH_2CH_2O$—; $R_2$ and $R_4$ are both one or a combination of two of H or —$CH_3$; $R_3$ is one or a combination of two or more of H, —COOH, —$CH_3$, —$CH_2CH_3$, a phenyl or a phenyl derivative; and $R_5$ is one or a combination of two or more of H, an alkali metal ion, an alkyl containing 1 to 6 carbon atoms, a hydroxyalkyl containing 1 to 6 carbon atoms, an alkoxy containing 1 to 6 carbon atoms, a phenyl or a phenyl derivative.

2. A preparation method of a multi-arm polycarboxylate water reducer, used for preparing the multi-arm polycarboxylate water reducer according to claim 1, comprising the following steps:

Step 1: preparation of a tetrazole derivative: subjecting a phenolic hydroxyl containing rigid compound and p-nitrobenzonitrile to a nucleophilic substitution reaction in a solvent, then subjecting a reaction product and a sodium azide to reflux in a solvent and water mixed solution, and conducting a 1,3-dipolar cycloaddition reaction for 3 hours to 10 hours under action of a catalyst to obtain the tetrazole derivative;

Step 2: preparation of a tetrazole-containing multi-arm unsaturated polyether macromonomer: making an unsaturated polyether macromonomer subjected to terminal halogenation with epoxy halogenated propane under action of boron trifluoride diethyl etherate, then react with the tetrazole derivative prepared in Step 1 for 3 hours to 10 hours to obtain the tetrazole-containing multi-arm unsaturated polyether macromonomer; and Step 3: preparation of a multi-arm polycarboxylate water reducer integrating shrinkage reducing and antibacterial functions: subjecting the tetrazole-containing multi-arm unsaturated polyether macromonomer prepared in Step 2, an unsaturated carboxylic acid small monomer and an unsaturated polyether macromonomer to a free radical polymerization reaction for 3 hours to 5 hours at 10° C. to 50° C. under combined action of an initiator, a reducing agent and a molecular weight regulator to obtain the multi-arm polycarboxylate water reducer integrating the shrinkage reducing and antibacterial functions, wherein a molar ratio of the tetrazole-containing multi-arm unsaturated polyether macromonomer, the unsaturated carboxylic acid small monomer, the unsaturated polyether macromonomer, the initiator, the reducing agent and the molecular weight regulator is 1: (2 to 80): (1 to 20): (0.02 to 0.2): (0.02 to 0.25): (0.02 to 0.2).

3. The preparation method of the multi-arm polycarboxylate water reducer according to claim 2, wherein in Step 1, the phenolic hydroxyl containing rigid compound is any one or a combination of two or more of 4,4'-dihydroxybiphenyl, 4,4',4"-methylenetriphenol, 1,1,1-tris(4-hydroxyphenyl)ethane, 1,3,5-tris(4-hydroxyphenyl)benzene, 1,1,2,2-tetrakis(4-hydroxyphenyl)ethane, 2,3',4,5',6-pentahydroxybiphenyl, hexahydroxybenzene, 5-(3,4,5-trihydroxyphenyl)benzene-1,2,3-triol or 4-[2,3,4,5,6-penta(4-hydroxyphenyl)phenyl] phenol.

4. The preparation method of the multi-arm polycarboxylate water reducer according to claim 2, wherein in Step 1, the solvent is any one or a combination of two or more of acetonitrile, methanol, ethanol, ethylene glycol, isopropanol, tert-butanol, acetone, dichloromethane, chloroform, benzene, toluene, dimethyl sulfoxide, N,N-dimethylformamide, and 1,2-dichloroethane.

5. The preparation method of the multi-arm polycarboxylate water reducer according to claim 2, wherein the catalyst is any one or a combination of two or more of ammonium chloride, zinc chloride, aluminum chloride or ferric chloride.

6. The preparation method of the multi-arm polycarboxylate water reducer according to claim 2, wherein the unsaturated polyether macromonomer is any one or a combination of two or more of allyl polyoxyethylene ether, methallyl polyoxyethylene ether, isopentenol polyoxyethylene ether, vinyl polyoxyethylene ether or 4-hydroxybutyl vinyl polyoxyethylene ether.

7. The preparation method of the multi-arm polycarboxylate water reducer according to claim 2, wherein in Step 2, the epoxy halogenated propane is any one or a combination of two or more of epifluorohydrin, epichlorohydrin or epiboromohydrin.

8. The preparation method of the multi-arm polycarboxylate water reducer according to claim 2, wherein in Step 3, the unsaturated carboxylic acid small monomer is any one or a combination of two or more of acrylic acid, methacrylic acid, maleic acid, sodium acrylate, sodium methacrylate, sodium maleate, potassium acrylate, potassium methacrylate, potassium maleate, 2-vinylbenzoic acid, 2-vinylphenylacetic acid, 2-methyl vinyl benzoate acrylic acid, methyl acrylate, methyl methacrylate, ethyl acrylate, ethyl methacrylate, hydroxyethyl acrylate, hydroxyethyl methacrylate, butyl acrylate, and hydroxy n-butyl methacrylate.

9. The preparation method of the multi-arm polycarboxylate water reducer according to claim 2, wherein in Step 3, the initiator is any one or a combination of two or more of hydrogen peroxide, ammonium persulfate, sodium persulfate, potassium persulfate, azobisisobutyronitrile or azobisisoheptanenitrile; the reducing agent is any one or a combination of two or more of vitamin C, sodium sulfite, sodium bisulfite, sodium metabisulfite, or sodium hypophosphite; and the molecular weight regulator is any one or a combination of two or more of mercaptoethanol, mercaptoacetic acid, 2-mercaptopropionic acid, 3-mercaptopropionic acid, dodecanethiol, or sodium methyl propenyl sulfonate.

\* \* \* \* \*